(12) United States Patent
Longe (10) Patent No.: US 8,299,943 B2
(45) Date of Patent: Oct. 30, 2012

(54) MULTIPLE PREDICTIONS IN A REDUCED KEYBOARD DISAMBIGUATING SYSTEM

(75) Inventor: Michael R. Longe, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 1217 days.

(21) Appl. No.: 12/113,801

(22) Filed: May 1, 2008

(65) Prior Publication Data

US 2008/0291059 A1 Nov. 27, 2008

Related U.S. Application Data

(60) Provisional application No. 60/939,481, filed on May 22, 2007.

(51) Int. Cl.
*H03M 11/00* (2006.01)
(52) U.S. Cl. ............ 341/22; 341/20; 345/168; 345/169; 710/67; 455/422.1
(58) Field of Classification Search .............. 341/20–35; 345/168–184; 710/67, 73
See application file for complete search history.

(56) References Cited

U.S. PATENT DOCUMENTS

| | | |
|---|---|---|
| 3,675,513 A | 7/1972 | Flannagan et al. |
| 4,191,854 A | 3/1980 | Coles |
| 4,427,848 A | 1/1984 | Tsakanikas |
| 4,650,927 A | 3/1987 | James |
| 5,007,008 A | 4/1991 | Beers |
| 5,109,352 A | 4/1992 | O'Dell |
| 5,392,338 A | 2/1995 | Danish et al. |
| 5,748,512 A | 5/1998 | Vargas |
| 5,784,008 A | 7/1998 | Raguseo |
| 5,818,437 A | 10/1998 | Grover et al. |
| 5,952,942 A | 9/1999 | Balakrishnan et al. |
| 5,953,541 A | 9/1999 | King et al. |
| 6,009,444 A | 12/1999 | Chen |
| 6,011,554 A | 1/2000 | King et al. |
| 6,054,941 A | 4/2000 | Chen |
| 6,104,317 A | 8/2000 | Panagrossi |
| 6,169,538 B1 | 1/2001 | Nowlan et al. |
| 6,172,625 B1 | 1/2001 | Jin et al. |
| 6,204,848 B1 | 3/2001 | Nowlan et al. |

(Continued)

FOREIGN PATENT DOCUMENTS

WO    WO 2005/024519    3/2005

(Continued)

OTHER PUBLICATIONS

Margo McCall, Predicting a Future for Wireless E-mail, Mar. 1, 2006, Wireless Week.*

(Continued)

*Primary Examiner* — George Bugg
*Assistant Examiner* — Franklin Balseca
(74) *Attorney, Agent, or Firm* — Michael A. Glenn; Glenn Patent Group (57) ABSTRACT

A computer receives user entry of a sequence of keypresses, representing an intended series of letters collectively spelling-out some or all of a desired textual object. Resolution of the intended series of letters and the desired textual object is ambiguous, however, because some or all of the key presses individually represent multiple letters. The computer interprets the keypresses utilizing concurrent, competing strategies, including one-keypress-per-letter and multi-tap interpretations. The computer displays a combined output of proposed interpretations and completions from both strategies.

10 Claims, 8 Drawing Sheets

U.S. PATENT DOCUMENTS

| | | | |
|---|---|---|---|
| 6,219,731 B1 * | 4/2001 | Gutowitz | 710/67 |
| 6,286,064 B1 | 9/2001 | King et al. | |
| 6,307,548 B1 * | 10/2001 | Flinchem et al. | 715/811 |
| 6,307,549 B1 | 10/2001 | King et al. | |
| 6,362,752 B1 | 3/2002 | Guo et al. | |
| 6,424,743 B1 | 7/2002 | Ebrahimi | |
| 6,502,118 B1 | 12/2002 | Chatterjee | |
| 6,686,852 B1 | 2/2004 | Guo | |
| 6,711,290 B2 | 3/2004 | Sparr et al. | |
| 6,757,544 B2 | 6/2004 | Rangarajan et al. | |
| 6,801,659 B1 | 10/2004 | O'Dell | |
| 6,807,529 B2 | 10/2004 | Johnson et al. | |
| 6,864,809 B2 | 3/2005 | O'Dell et al. | |
| 6,912,581 B2 | 6/2005 | Johnson et al. | |
| 6,947,771 B2 | 9/2005 | Guo et al. | |
| 6,955,602 B2 | 10/2005 | Williams | |
| 6,956,968 B1 | 10/2005 | O'Dell et al. | |
| 6,973,332 B2 | 12/2005 | Mirkin et al. | |
| 6,982,658 B2 | 1/2006 | Guo | |
| 7,057,607 B2 | 6/2006 | Mayoraz et al. | |
| 7,075,520 B2 | 7/2006 | Williams | |
| 7,095,403 B2 | 8/2006 | Lyustin et al. | |
| 7,139,430 B2 | 11/2006 | Sparr et al. | |
| 7,256,769 B2 | 8/2007 | Pun et al. | |
| 7,257,528 B1 | 8/2007 | Ritchie et al. | |
| 7,272,564 B2 | 9/2007 | Phillips et al. | |
| 7,313,277 B2 | 12/2007 | Morwing | |
| 7,349,576 B2 | 3/2008 | Holtsberg | |
| 7,389,235 B2 | 6/2008 | Dvorak | |
| 7,437,001 B2 | 10/2008 | Morwing et al. | |
| 7,466,859 B2 | 12/2008 | Chang et al. | |
| 7,779,011 B2 * | 8/2010 | Venkataraman et al. | 707/742 |
| 2002/0196163 A1 | 12/2002 | Bradford et al. | |
| 2003/0023426 A1 | 1/2003 | Pun et al. | |
| 2003/0054830 A1 | 3/2003 | Williams et al. | |
| 2003/0144830 A1 | 7/2003 | Williams | |
| 2004/0153963 A1 | 8/2004 | Simpson et al. | |
| 2004/0153975 A1 | 8/2004 | Williams et al. | |
| 2005/0009481 A1 | 1/2005 | Bushner | |
| 2005/0102600 A1 | 5/2005 | Anandakumar | |
| 2005/0114770 A1 | 5/2005 | Sacher et al. | |
| 2006/0013487 A1 | 1/2006 | Longe et al. | |
| 2006/0023802 A1 | 2/2006 | Balakrishnan et al. | |
| 2006/0129928 A1 | 6/2006 | Qiu | |
| 2006/0136408 A1 | 6/2006 | Weir et al. | |
| 2006/0155536 A1 | 7/2006 | Williams et al. | |
| 2006/0158436 A1 | 7/2006 | LaPointe et al. | |
| 2006/0173807 A1 | 8/2006 | Weir et al. | |
| 2006/0193519 A1 | 8/2006 | Sternby | |
| 2006/0236239 A1 | 10/2006 | Simpson et al. | |
| 2006/0239560 A1 | 10/2006 | Sternby | |
| 2007/0061718 A1 * | 3/2007 | Nurmi | 715/542 |
| 2007/0094718 A1 | 4/2007 | Simpson | |
| 2007/0156747 A1 | 7/2007 | Samuelson et al. | |
| 2007/0203879 A1 | 8/2007 | Templeton-Steadman et al. | |
| 2007/0250469 A1 | 10/2007 | Unruh et al. | |
| 2007/0276814 A1 | 11/2007 | Williams | |
| 2007/0285397 A1 | 12/2007 | LaPointe et al. | |
| 2008/0130996 A1 | 6/2008 | Sternby | |

FOREIGN PATENT DOCUMENTS

WO    WO 2006/046987    5/2006

OTHER PUBLICATIONS

U.S. Appl. No. 10/176,933, filed Jan. 31, 2008, Kay et al.
U.S. Appl. No. 11/379,354, filed Apr. 19, 2006, Unruh et al.
U.S. Appl. No. 12/023,903, filed Jan. 31, 2008, Kay et al.
U.S. Appl. No. 11/177,477, filed Jul. 11, 2005, Longe.
U.S. Appl. No. 11/609,697, filed Dec. 12, 2006, Samuelson.
McCall, Margaret; "Predicting a Future for Wireless E-mail"; Mar. 1, 2006; Wireless Week, http://www.wirelessweek.com/article/aspx?id=82402.

* cited by examiner

| 1<br>. – ' | 2<br>ABC | 3<br>DEF |
|---|---|---|
| 4<br>GHI | 5<br>JKL | 6<br>MNO |
| 7<br>PQRS | 8<br>TUV | 9<br>WXYZ |
| *<br>Shift | 0<br>Next | #<br>Space |

MULTIPLE PREDICTIONS IN A REDUCED KEYBOARD DISAMBIGUATING SYSTEM

CROSS-REFERENCE TO RELATED APPLICATIONS

This application claims the benefit of the following earlier-filed U.S. Provisional Application in accordance 35 USC 119: U.S. 60/939,481, filed May 22, 2007 in the name of Michael Longé. The entirety of the foregoing application is hereby incorporated herein by reference.

BACKGROUND OF THE INVENTION

1. Field of the Invention

The present invention relates to systems for resolving a user's intended entry of textual objects using a reduced keyboard, where the intended textual objects are ambiguous because some or all of the key presses individually represent multiple letters. More particularly, the invention concurrently automatically applies competing interpretation strategies including one-keypress-per-letter and a multi-tap, and presents the user with a combined output from both strategies.

2. Description of the Related Art

Handheld digital devices are becoming increasingly widespread. Some digital devices are dedicated to simpler tasks, as in the case of a television remote control. Other devices offer general purpose computing platforms, as in the case of personal data assistants (PDAs). Other devices offer a combination of these, as in the case of many mobile phones, which place and receive calls, but also perform address management, web surfing, text messaging, and other computing functions.

Although some handheld, general purpose computers offer a full keyboard, many others do not. Many mobile phones only come with a simple keypad of twelve keys. Without a full keyboard, text entry is still possible, but some shortcuts and accommodations are inevitable. Accordingly, being constrained with a reduced keyboard presents many challenges in designing user interfaces that are simple, intuitive, fast, and powerful.

SUMMARY OF THE INVENTION

A computer receives user entry of a sequence of keypresses, representing an intended series of letters collectively spelling-out some or all of a desired textual object. Resolution of the intended series of letters and the desired textual object is ambiguous, however, because some or all of the key presses individually represent multiple letters. The computer interprets the keypresses utilizing concurrent, competing strategies, including one-keypress-per-letter and multi-tap interpretations. The computer displays a combined output of proposed interpretations and completions from both strategies.

The teachings of this disclosure may be implemented as a method, apparatus, logic circuit, storage medium, or a combination of these. This disclosure provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings.

Hardware Components & Interconnections

Introduction

Figure 1A:
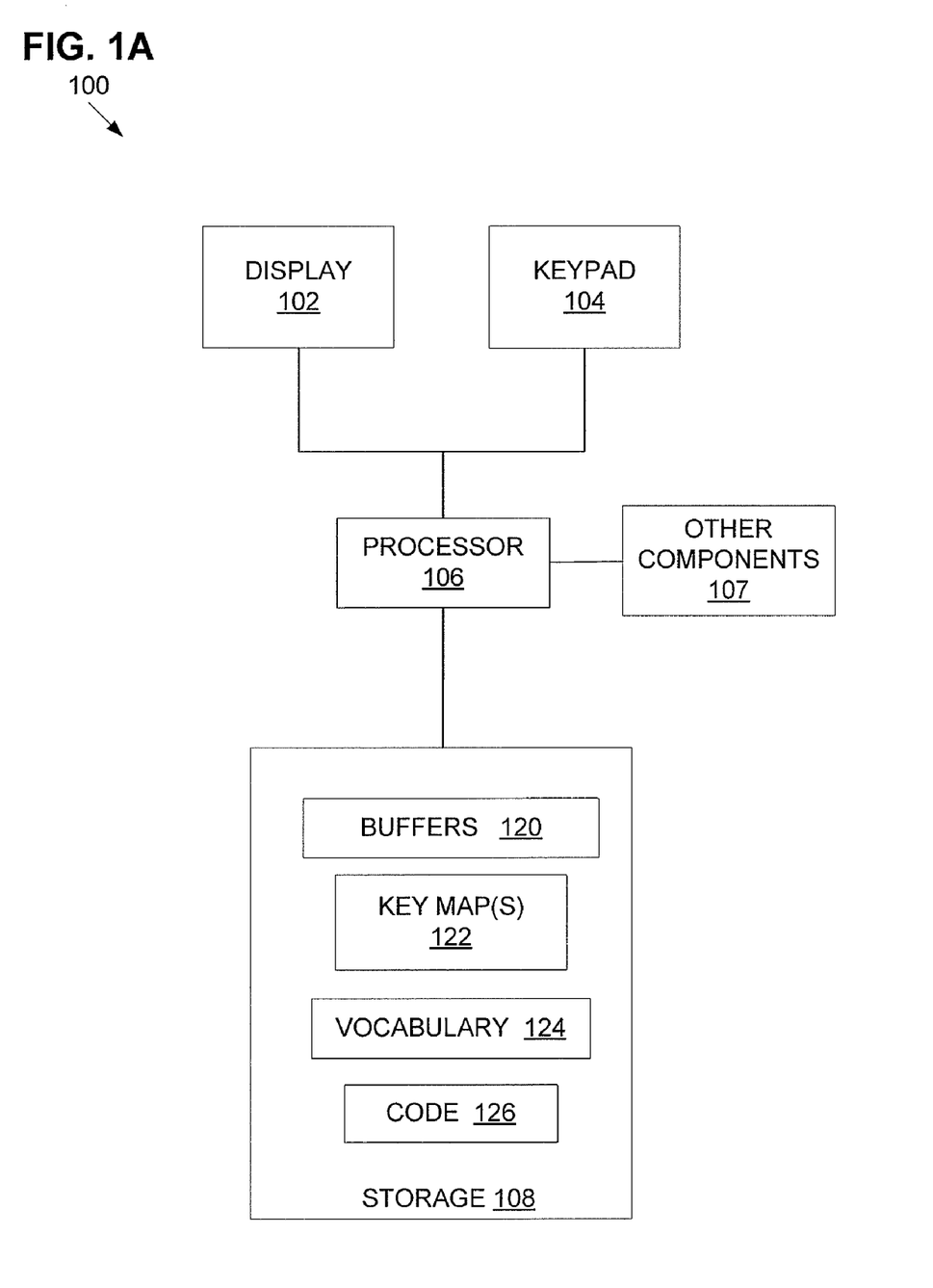
FIG. 1A is an overall system block diagram.

One aspect of the present disclosure concerns a handheld digital device, as exemplified by device 100 of FIG. 1A. The device 100 may be implemented in different forms, such as a cell phone, satellite phone, wireless radio, PDA, GPS, etc.

Display

The device 100 includes a display 102 to visibly present human readable information to the user. In one example, the display 102 comprises a relatively small LCD display of a mobile phone. However, the display 102 may be implemented by another size or configuration of LCD display, CRT, OLED or plasma display, laser or holographic output, or any other device for receiving a machine-readable input signal and providing a human-readable output.

Figure 1B:
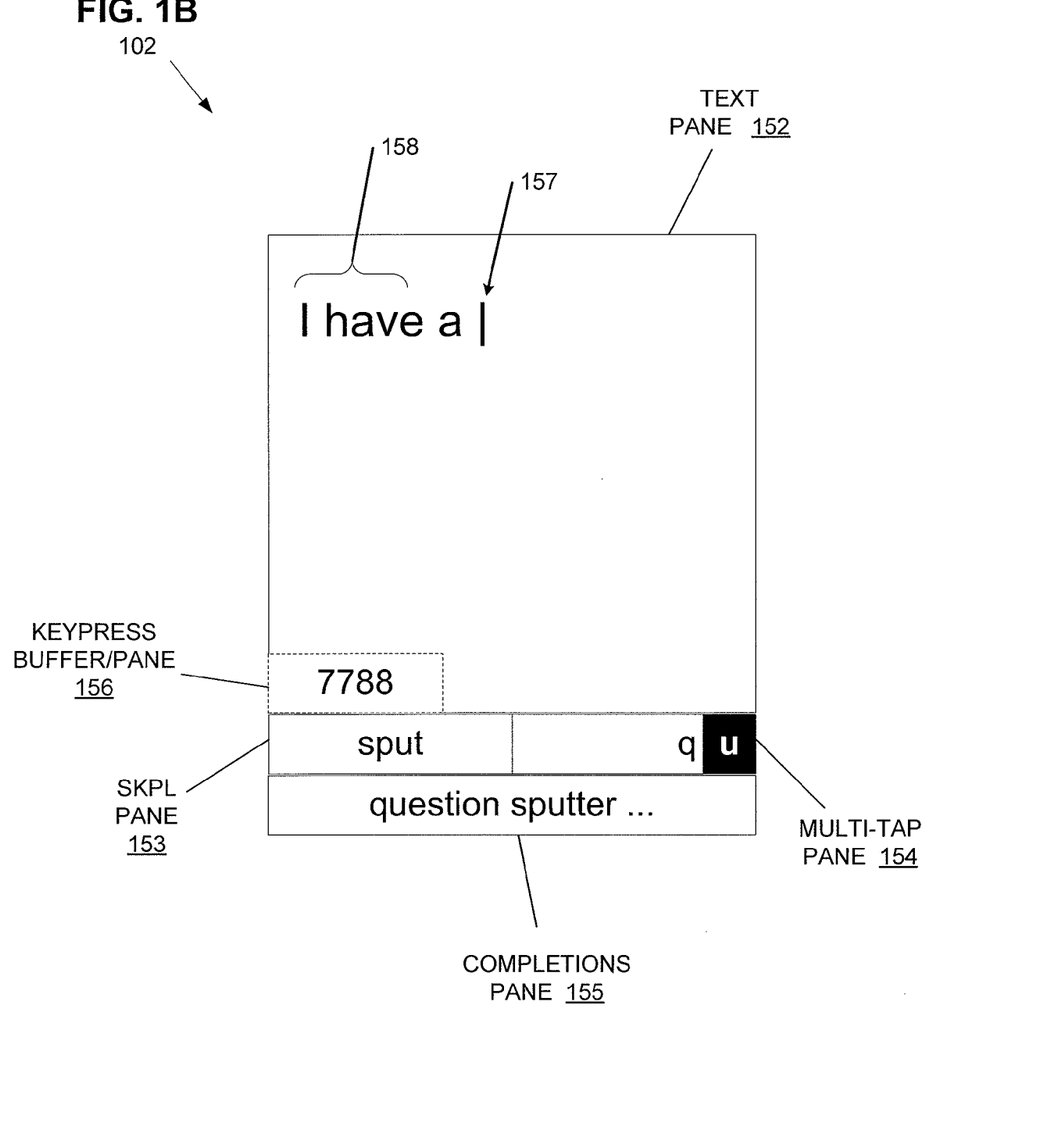
FIG. 1B shows one example of a display.

As shown in FIG. 1B, the display 102 in this example includes various panes 152-156. These include a text pane 152, which displays words that have been entered and confirmed by the user (such as 158). Optionally, the text pane 152 may show a default interpretation (not shown) of the current key sequence, where this interpretation is not yet confirmed. The default interpretation, if this option is used, may begin at a text insertion point 157. The keypress buffer sequence pane 156 lists the key presses being interpreted. It may also serve as the numeric interpretation of the current key sequence, permitting entry of arbitrary digit sequences without changing to a numeric mode. Optionally, the pane 156 may be hidden, but its illustration persists in the drawings because it is helpful to explain the operation of the other panes.

The single-keypress-per-letter (SKPL) pane 153 presents SKPL interpretation of the keypresses 156. The multi-tap pane 154 presents a multi-tap interpretation of the keypresses 156. The SKPL and multi-tap methodologies are discussed in greater detail below. The completions pane 155 contains entries from the vocabulary 124 (discussed below) that meet the following criteria: a character sequence in the panes 153 or 154 forms the beginning (or entirety) of the vocabulary entry. Word completion refers to the act of proposing a full word (or phrase) that completes the word prefix entered so far, and may also be referred to herein as word prediction.

In other embodiments, the arrangement of panes may vary. For example, the interpretations/panes 153-156 may form a segmented vertical list floating over the text pane 152, with the multi-tap or numeric interpretation at the top, SKPL interpretations in the middle, and completions at the bottom of the list. Many other arrangements are possible.

Keypad

Referring to FIG. 1A, the keypad 104 comprises any input device with a plurality of defined switches, locations, keys, soft keys, or other feature associated with input "letters" (defined broadly). These will be referred to as "keys." Some examples of a keypad include a touch sensitive screen having defined areas for keys; discrete mechanical or membrane keys; virtual keyboards, which shall include by way of example, but not limitation, virtual-reality keyboards, laser-projection keyboards, muscle-sensing keyboards, and fabric keyboards; on-screen keyboard for a personal computer, media player, or game console. This disclosure provides some examples of the type and number of keys below in the discussion of key maps 122, below.

In addition to the keypad 104, the device 100 may include other user input tools, such as joystick, rocker, handwriting digitizing surface, mouse, roller ball stylus, track ball, mouse, pointing stick, combination of these, or other mechanism appropriate to the application at hand.

Processor

In addition to performing various computations concerning the operation of the device 100, the processor 106 manages the display 102, receives and interprets input from the keypad 104, and reads/writes data to/from storage 108. The processor 106 may be coupled to other components 107, depending on how the device 100 is implemented. Some examples of these components 107 include a transmitter, receiver, microphone, speaker, input/output ports, charging circuitry, etc.

In one example, the processor 106 is a digital data processing entity such as those used in PDAs. However, in a more general sense, the function of the processor 106 may be implemented by one or more hardware devices, software devices, a portion of one or more hardware or software devices, or a combination of these. The makeup of these subcomponents is described in greater detail below, with reference to FIGS. 2-4.

Storage

Broadly, the storage 108 serves to store digital data for on-demand access by the processor 106. In one example, the storage 108 comprises micro-sized flash memory of the type used in compact applications such as PDAs. However, the storage 108 may be implemented by a variety of hardware, as discussed in detail below with reference to FIGS. 3-4. As to data structure for storage subcomponent components 120, 122, and 124, these may be implemented by linked lists, lookup tables, relational databases, registers, or other useful data structure. As to the code 126 (discussed below), the data structure for this component may include compiled code, interpreted code, source code, object oriented programming, machine instructions, or any other appropriate format.

Buffers

The storage 108 may include various buffers 120. These may be physical structures, software, or merely conceptual constructs used herein to illustrate the operation of the system 100. Among these buffers, an input buffer stores a record of keypresses and other user inputs. The input buffer preserves the user entries in the order of entry, or at least stores some record of that order. Other buffers, for example, may be provided for functions such as keeping track of the contents of the displayed panes 152-156, etc.

Key Map(s)

Key maps 122 indicate which letters items are assigned to which keys of the keypad 104. Although this disclosure makes reference to keypad entry of "letters" for the sake of convenience and without any intended limitation, these may vary according to the intended utility. Some examples include alphabetic letters, symbols, punctuation, numerals, non-alphabetic phonetic letters, and other input to the keypad keys. Still further examples include accented or unaccented letters or other characters or symbols of a written script, including those that represent a phonetic or sub-word component, including Japanese kana, Korean jamos, and Chinese zhuyin, or other linguistic and non-linguistic characters such as digits and punctuation commonly found in computer-based text. Optionally, different mappings may be used according to contexts, application program, user-selection, etc. The term "letter," then, is used broadly in this disclosure and may include any or all of the foregoing.

Figure 1C:
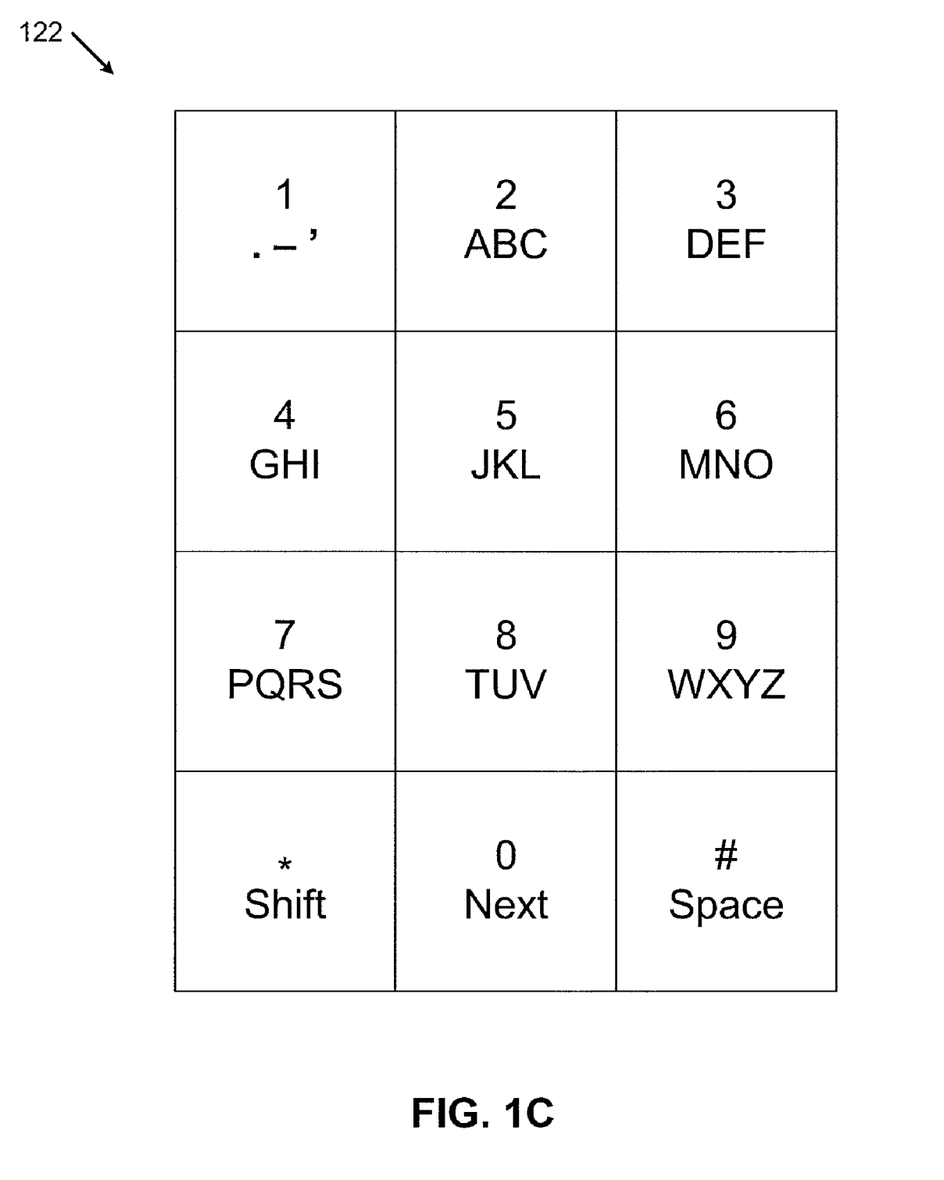
FIG. 1C shows a keypad example.

An exemplary mapping appears in FIG. 1C. This mapping is appropriate for user entry of Indo-European language words, Pinyin, romaji, and some phonetic representations of logographic characters. Other mappings may be applied as appropriate for other non-Latin scripts such as Hindi and other languages, dialects, etc.

As demonstrated by FIG. 1C, the map 122 produces inherently ambiguous results when the user enters keypresses to signify alphabetic letters, since multiple letters are always assigned to the same key. Namely, user-entered key presses are inherently ambiguous in that the key sequence could represent different combinations of intended letters, depending upon which letter interpretation was intended for each key press.

In order to identify key presses unambiguously in this disclosure, shorthand reference is made to the numeral on the key. For instance, a "2" key is shorthand for the key of FIG. 1C depicting "2" and "ABC," even though the numeral itself might be irrelevant to the discussion.

Vocabulary

A vocabulary 124 contains a listing of textual objects that are recognized by the system 100. A textual object is a linguistic object, such as a string of one or more letters, characters, or symbols of a written script forming a word, name, word stem, prefix or suffix, phrase, abbreviation, chat slang, emoticon, user ID, URL, recognized phonetic spelling of a logographic character or character phrase or character component, etc. Each textual object listed in the vocabulary is an "entry" of the vocabulary. Entries in the vocabulary 124 may also be referred to as "valid entries" or "recognized entries" to emphasize the fact that user-entered text is being evaluated against the established vocabulary. Without any intended limitation, this disclosure utilizes "word" as shorthand for textual object, for ease of reading.

The system 100 may include one vocabulary 124 (as illustrated) or multiple vocabularies. One example of a vocabulary is "American English words." Another example vocabulary example is "German words." Another example of a vocabulary is Pinyin spellings of Chinese characters. The system may use separate vocabularies in separate applications, or it may use all vocabularies concurrently. For ease of explanation, however, the present discussion assumes a single installed vocabulary, and more particularly, a vocabulary of American English words. In any case, the entries in the vocabulary be taken or derived from various known standards, extracted from corpus, supplemented based on actual use, etc.

The vocabulary 124 may be fixed at manufacture of the system 100, or downloaded upon installation or boot-up or reconfiguration or another suitable time. The vocabulary 124 may self-update to gather new phrases from time to time, by consulting users' previous input, the Internet, wireless network, or another source.

The vocabulary 124, explained as a sequence of text objects, is useful for ease of explanation. However, the vocabulary 124 may not even contain words or letters at all, and instead it may contain key sequences to save time in interpreting key sequences and then cross-referencing the vocabulary. In this respect, the vocabulary 124 may be implemented by one or more trees, run-length-encoded table structures, or other optimized data.

Code

Code 126 represents machine readable instructions for execution by the processor 106. Thus, the code 126 may provide the processor 106 with some or all of its functionality. Some further details of the code 126 are explained below in conjunction with FIGS. 2-4. As will be seen, the code 126 may be omitted entirely in cases where the processor 106 favors logic circuitry or other alternatives over machine-executable instructions.

Exemplary Digital Data Processing Apparatus

As mentioned above, data processing entities (such as the processor 106) may be implemented in various forms.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
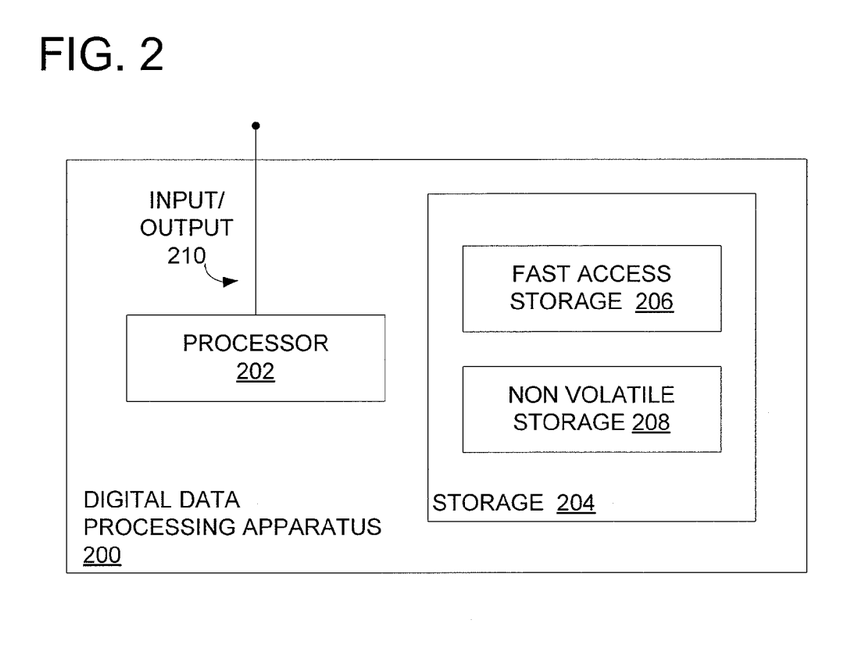
FIG. 2 is a block diagram of a digital data processing machine.
Figure 3:
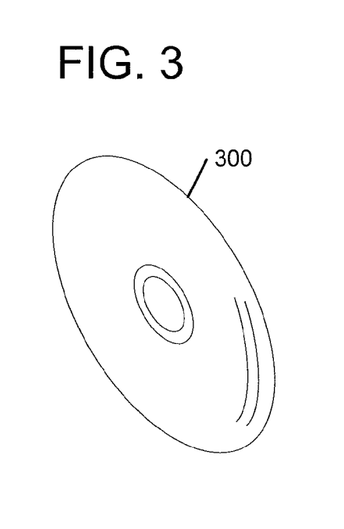
FIG. 3 shows an exemplary storage medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to a digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide storage used by the system 100 (FIG. 1), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions (as described above), a different embodiment uses logic circuitry to implement data processing entities such as the processor 106.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
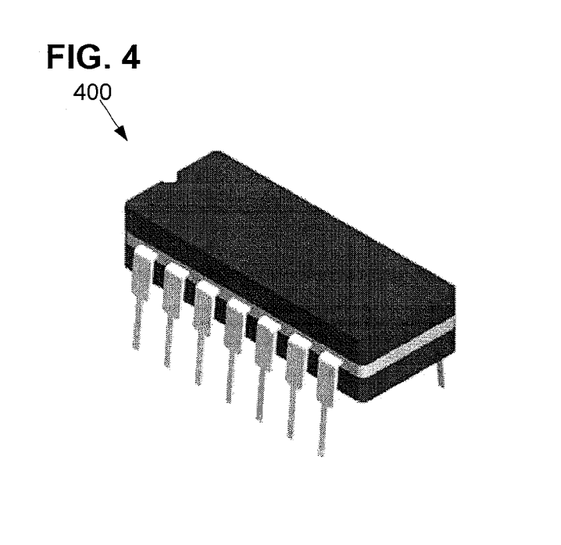
FIG. 4 is a perspective view of exemplary logic circuitry.

FIG. 4 shows an example of logic circuitry in the form of an integrated circuit 400.

OPERATION

Having described the structural features of the present disclosure, the operational aspect of the disclosure will now be described. The steps of any method, process, or algorithm described in connection with the embodiments disclosed herein may be embodied directly in hardware, in a software module executed by hardware, or in a combination of the two.

Terminology

This disclosure refers to the SKPL technology and multi-tap disambiguation strategies. Broadly, SKPL concerns single-key-per-letter technology, including word-based and phrase-based disambiguation methods, and may also be referred to as predictive text. Multi-tap refers to multiple-key-per-letter technology. For general reference, some are other letter-based disambiguation methods include as two-key input (including chording) and select-and-scroll.

SKPL

SKPL assumes that each keypress represents a single user-intended letter (or numeral or symbol, etc.). Since various keys represent multiple letters, the device 100 considers all of the possibilities for each keypress to formulate the text string spelled out by the user's keypresses the device 100. Therefore, after each keypress, the system considers the various possible combinations by taking one letter from this key press, and one letter from each key press previously entered. Although theoretically possible, generating all combinations of letter sequences becomes impractical after just a few keys. Therefore, certain known shortcuts are taken to limit the potential combinations.

The system 100 examines the vocabulary 124 to determine whether the current key sequence corresponds to any complete words in the vocabulary 124, or whether the current key sequence forms the stem (beginning one or more letters) of any words in the vocabulary 124. A stem may refer to a prefix, root word, or component of a textual object. The device 100 presents some or all of these to the user. Optionally, the device may order the found words based on recency of use, context, frequency of use by the user or general population or other group, and/or other factors.

Certain instances of SKPL technology are available in a number of commercially available products under the trademark "T9." SKPL technology is additionally described in a number of patents and publications, with some examples including: U.S. Pat. Nos. 5,818,437, 6,307,549, 6,286,064, U.S. application Ser. No. 10/176,933.

Multi-Tap

In contrast to SKPL, with the multi-tap interpretation strategy, the user enters repeated keypresses to cycle through the letters assigned to a key. For instance, pressing the "8" key twice would enter the letter "U." Pressing the "8" key three times designates the letter "V."

The user can confirm entry of a given letter in one or all of the following ways. First, a letter is confirmed when the user presses a different key. For instance, if the user presses the "2" key three times and then begins to press the "5" key, this confirms entry of a "C" since it was the third letter on the "2" key. Second, a letter is confirmed when the user delays for a predetermined period of time after pressing a given key one or more times. For instance, if the user presses the "2" key twice, and waits (for example, less than one second), this confirms entry of a "B." Third, a letter is confirmed when the user affirmatively enters a space or other letter delimiter, such as the right-arrow key, with the keypad or other data entry tool.

As an alternative to letter confirmation, the device 100 may analyze some or all of a keypress sequence as a whole. An exemplary keypress sequence is "666667777." Here, the system may interpret the sequence as "NOS" (66-666-7777) or MOMS (6-666-6-777-7). In order to perform this type of analysis, the system considers the input sequence as a whole, and figures all possible delineations between letters. Then, having allocated keypresses to letters, the system identifies each letter by the number and identity of its allocated keypresses.

There are a number of commercially available products that employ multi-tap technology. Moreover, this technology is described in a number of U.S. patents, with some examples including Nos.: U.S. Pat. Nos. 3,675,513, 4,191,854, 4,427,848, 5,007,008, 5,392,338, 5,748,512.

Simple Example

In a broad sense, the device 100 aims to resolve a user's intended entry of textual objects via the keypad 104. But the intended textual objects are ambiguous because some or all of the key presses individually represent multiple letters. The system 100 applies concurrent and competing strategies, which in this example include SKPL and multi-tap. Ultimately, the system 100 presents the user with a combined output, which contemplates interpretations from both of the competing strategies.

With this strategy, the result is more convenient to the user because it avoids any requirement for the user to change between a SKPL mode and a multi-tap mode. Furthermore, by providing both SKPL and multi-tap interpretations continuously, the device 100 may help a multi-tap user become more accustomed to using SKPL, or vice versa. It is also advantageous to the device manufacturer, who does not have to provide a separate mode key or determine which mode should be the default for each type of entry field.

A simple example is now discussed, using the example of FIG. 1B. This drawing illustrates a moment in time. The user has previously entered, and the system has resolved, keypresses to form the words "I have a" as shown by 158. The past text entry is not discussed further. However, after entering these keypresses (by whichever manner) to form "I have a" (158) the user in this example has continued entering keypresses. The new keypresses include the following sequence: "7788." This discussion omits the steps and results of interpreting each keypress up to this point (e.g., "7" and then "77" and then "778" and so on), for ease of explanation.

Under the SKPL approach, the sequence "7788" must be interpreted so that each keypress represents one letter. So, each "7" could represent P or Q or R or S. Each "8" could represent T or U or V. At this point, the stem of only one entry in the vocabulary 124 of this example will match the key sequence so far—the word "sputter." Therefore, under SKPL interpretation, the combination of keypresses so far is shown in the SKPL pane 153 as the stem "sput." The system could also present the SKPL interpretation (so far) in the text pane 152 as the default interpretation at the text insertion point 157, but this is implementation dependent, since the multi-tap interpretation produced so far (as discussed below) could be shown in the text pane 152 instead.

Under multi-tap, the sequence "7788" is interpreted with a different set of rules than SKPL. Generally, a new keypress of a given key signifies the first letter assigned to a key, but the second occurrence of the same keypress will signify the second assigned letter, and the third keypress will signify the third assigned letter. Of course, timing is an additional element of this strategy, but for ease of explanation, the present example assumes that the sequence "7788" has been entered without delay.

Under the multi-tap interpretation, the "77" represents a Q, and the "88" represents a "U." So, the multi-tap interpretation (so far) is "qu," which appears in the multi-tap pane 154.

The system 100 prepares the completions pane 155 as follows. The system identifies each entry in the vocabulary 124 that begins with the multi-tap interpretation (here, "qu") as well as each entry that begins with the SKPL interpretations (here, "sput"). The word completions possible under multi-tap include "question," "quest," "quiz," "quill," and many more. The only word completion possible under SKPL is "sputter".

In the current example of the vocabulary 124, the device 100 shows "question" and "sputter" in the pane 155. The device 100, accounting for the limited size of the pane 155, prioritizes the list according to frequency or recency of use or context or other factors as discussed in greater detail below. The ellipsis shown in the pane 155 indicates that there are more proposed completions, but the pane is too small to show them all. To reveal additional completions, the user may employ an appropriate means of scrolling the pane, such as tapping the stylus on the ellipsis or pressing the right-arrow key repeatedly.

More Detailed Example

FIGS. 6A-6E show a more detailed, step-by-step, example. Without the need for individual marking, each of the screenshots 6A-6E inherently includes the same panes 152-156 as shown in FIG. 1B and discussed above. Before this series of screen shots, the user has already entered and confirmed the words "Be at" which appear in the construction pane 152 at 602.

Figure 6A:
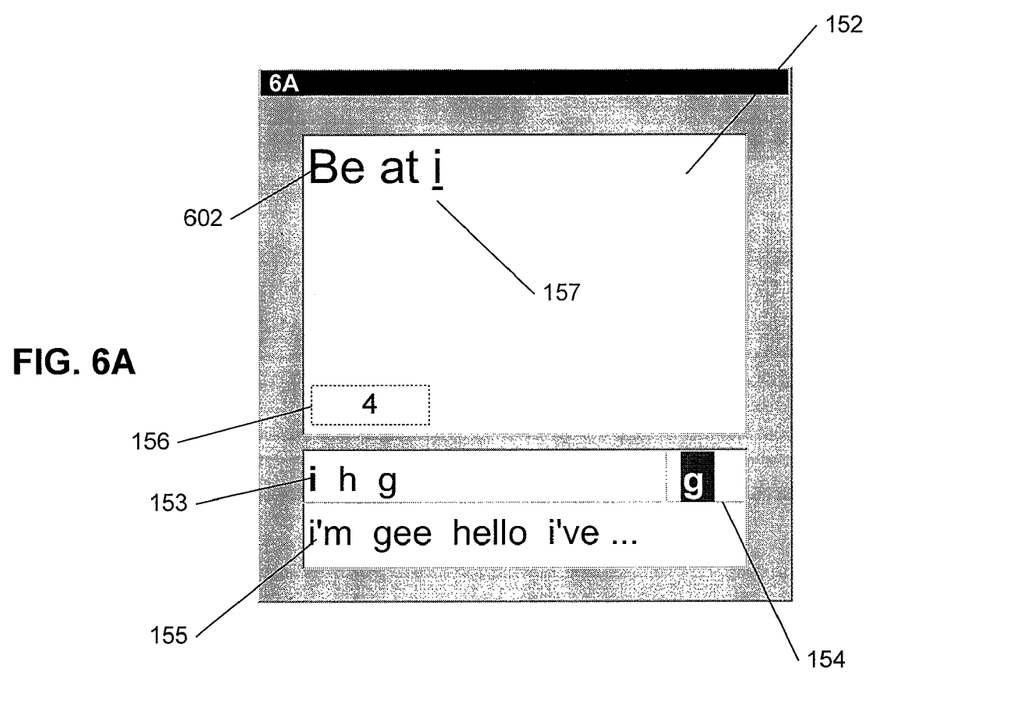
FIGS. 6A-6E show various screen shots.

In FIG. 6A, the user has just entered a "4" keypress, as shown in the pane 156. The SKPL pane 153 interprets this as the word "I" or the letter "H" or "G." The multi-tap pane 154 interprets the single "4" keypress as "G." Possible completions based on vocabulary entries are those that start with "I" or "H" or "G." The pane 155 shows some proposed completions. Due to space limitations, the pane 155 does not always have enough room to show all entries. Therefore, the system may order the proposed completions by context, frequency of use, recency of use, or other criteria, and leave out the lower-ranked entries that do not fit. As a different or additional embodiment, panes such as 153-155 may provide vertical and/or horizontal scrolling features, enabling the user to view larger respective lists.

Figure 6B:
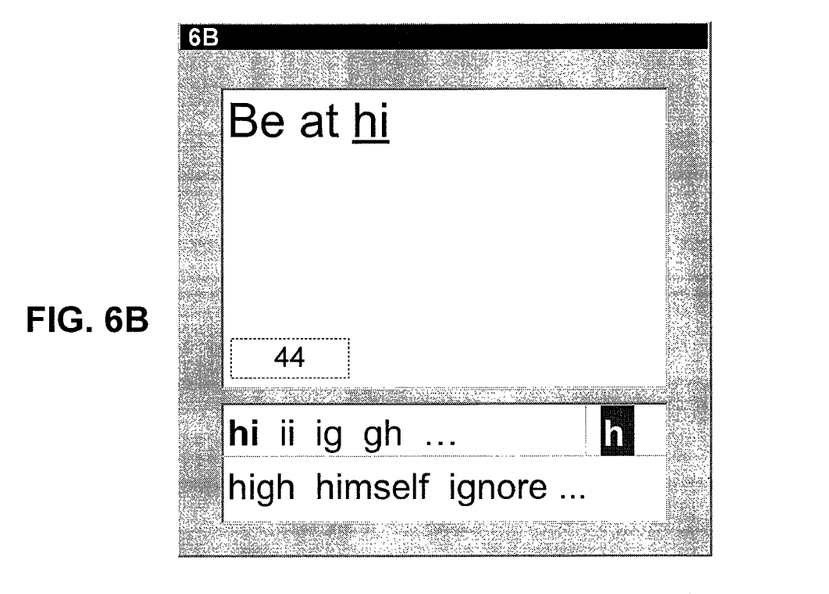

In FIG. 6B, the user has immediately added another "4" keypress, so the pane contains "44." The SKPL pane interprets the current keypress sequence ("44") as "HI" or "II" or "IG" or "GH." These are valid interpretations, since each corresponds to a complete word and/or the first two letters of an entry in the vocabulary. There may be other possible SKPL interpretations that are omitted from the pane 153 due to limited space, and indicated for example with an ellipsis. The SKPL approach may prioritize and limit display to the best alternatives.

The multi-tap pane 154 interprets the current keypress sequence (so far), two quick presses of the "4" key, as an "H." Possible word completions include all vocabulary entries that start with an "H." In some embodiments, such as this example, completions based on the one-letter multi-tap interpretation may be inhibited, to reduce the number of matches, or may be given lower priority. The pane 155 shows some proposed completions.

Figure 6C:
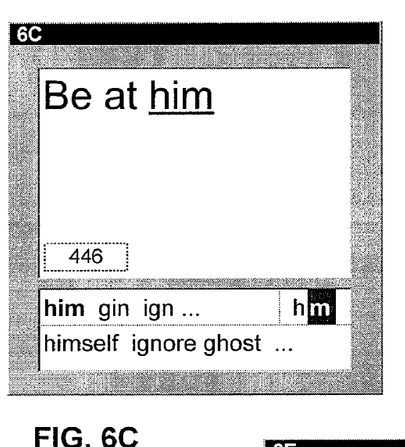

In FIG. 6C, the user has added a "6" keypress, so the pane contains "446." Under SKPL, the current keypress sequence ("446") is interpreted as the words "HIM" and "GIN" and the stem "IGN," which begin longer vocabulary entries such as "HIMSELF" and "IGNORE", etc. A prioritized subgroup of these appear (in pane 155) as possible completions. The multi-tap pane interprets the current keypress sequence (so far) as an "HM." In the displayed example, either no vocabulary entries match the multi-tap stem "HM" or the entries are low priority and do not appear at the top of the list of proposed completions.

Figure 6D:
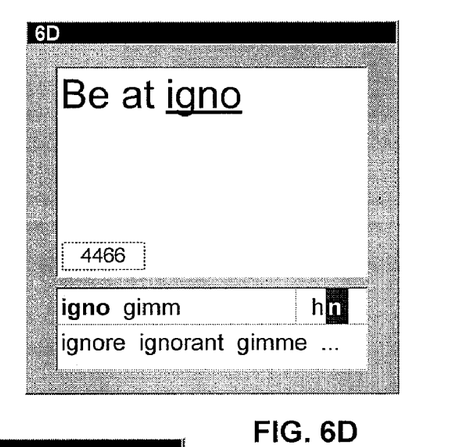

In FIG. 6D, the user has added a second "6" keypress, so the keypress buffer pane contains "4466." The SKPL pane 153 interprets the current keypress sequence ("4466") as "IGNO" or "GIMM". Vocabulary entries with these stems include words starting with "IGNO" and "GIMM," and more particularly, words such as "IGNORE" and "GIMME" and so on. The proposed completions in pane 155 include these words. The "6" keypress follows immediately after the preceding keypress, so the multi-tap pane 154 interprets the current keypress sequence as "HN." There are no matching vocabulary entries matching the multi-tap stem "HN."

Figure 6E:
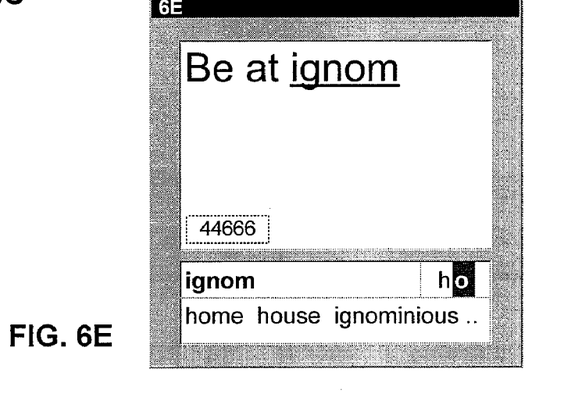

In FIG. 6E, the user has added a third "6" keypress, so the new word keypress buffer contains "44666." The SKPL pane 153 interprets the current keypress sequence ("44666") as "IGNOM", the stem of the only matching vocabulary word remaining. The multi-tap pane 154 interprets the current keypress sequence as an "HO." Thus, the proposed completions include entries that start with the stem "HO" (from multi-tap) and words that begin with the SKPL stem "IGNOM" (from SKPL). Some proposed word completions in pane 155 include "HOME" and "HOUSE" and "IGNOMINIOUS", etc.

In the embodiment illustrated throughout FIG. 6A-6E, the system 100 determines a "default word", which may be a complete word or a stem, among all SKPL and multi-tap interpretation and completion strategies and displays this word or stem at the insertion point 157. The device 100 shows the default word in bold to distinguish it from other items in the pane 153.

In one embodiment, the default word is the first SKPL interpretation. In an alternate embodiment, the default word is the multi-tap interpretation and the multi-tap pane 154 may be hidden. In either case, the user may select an alternate word or stem or completion by various means, such as by pressing the device's arrow (directional scroll) and OK keys or by selecting it directly with a finger or stylus. This causes the device to replace the default word displayed at the insertion point 157 with the selected word.

Operational Details

Introduction

Figure 5:
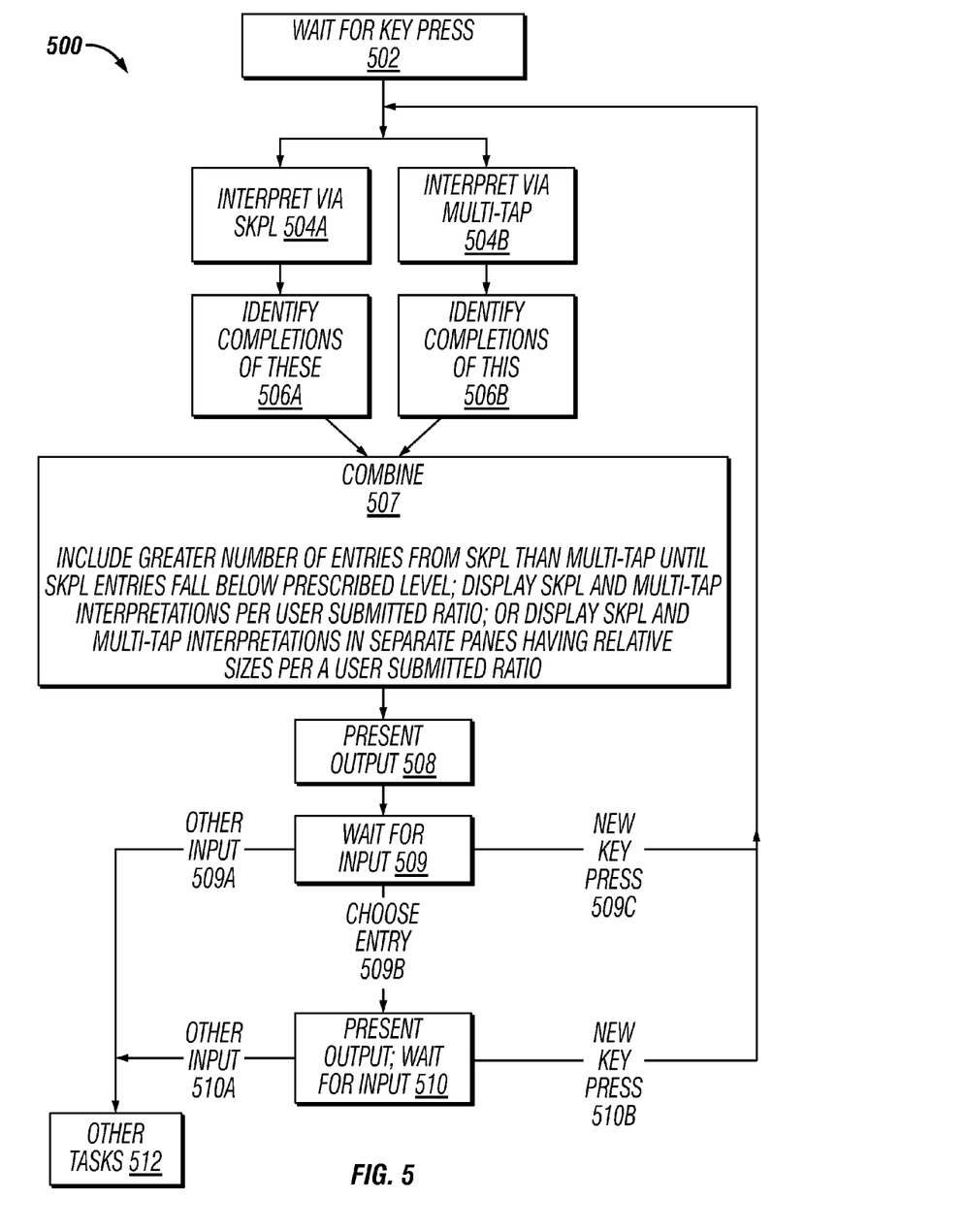
FIG. 5 is a flowchart of an operational sequence.

FIG. 5 shows an operational sequence 500 in a broader sense, not necessarily constrained to the foregoing examples. Without any intended limitation, the sequence 500 is described in the context of the hardware from FIG. 1A as described above. Sequence 500 occurs in the context of receiving user input in a data entry field, message text editor, search form, or other application relevant to the purposes of this disclosure.

Keypress Input

In step 502, the processor 106 and keypad 104 wait for the user to enter a keypress. In the present example, step 502 waits for the user to press one of the keypad keys "2" through "9," since these are assigned to the letters A through Z as depicted in FIG. 1C. In step 502, or at a later time, the processor 106 applies the key map 122 to identify the letters corresponding to key that was pressed. When step 502 senses an appropriate keypress, the routine 500 commences steps 504a and 504b.

Interpret & Complete

As illustrated, steps 504a and 506a occur in parallel with steps 504b and 506b. These steps need not start or finish at the exact same moment, but the general idea is that steps 504a, 506a may overlap to some extent in order to expedite the routine 500. Of course, the events 504a, 506a, 504b, 506b may occur in serial, at the expense of adding overall delay to the routine 500.

In step 504a, the processor 106 interprets the contents of the keypress buffer 156 (which now includes the keypress from step 502) according to an SKPL interpretation. In brief, this involves searching a vocabulary database or traversing a tree structure using the current key sequence as an index key or its equivalent. Also in step 504a, the processor 106 displays a reasonable number of SKPL words and word stems in the SKPL pane 153. This may include all valid interpretations (by affording a scrolling or other automatic or user-driven advancing feature), or a limited set selected according to frequency of use, recency of use, context, or other factors. If the pane 153 can display only a subset of interpretations, the pane 153 may further include a representative symbol such as ellipses, scrolling bar, icon, etc.

Step 506a determines, for each of the interpretations from step 504a, whether these interpretations constitute entries (or stems to entries) in the vocabulary 124. In other words, step 506a determines whether each interpretation from 504a matches an entry in the vocabulary 124, or if one or more vocabulary entries form word completions of this interpretation. Thus, these longer entries represent possible (SKPL) completions of the user's keypress sequence in progress.

In step 504b, the processor 106 conducts a multi-tap interpretation of the pane 156. Also in step 504b, the processor 106 displays this interpretation (or more than one, if others are possible) in the multi-tap pane 154. Step 506b determines whether the character combination from step 504b matches the first character(s) of entries in the vocabulary 124 (such that the vocabulary entry acts to complete the character combination), or even if it matches one of the vocabulary 124 entries outright.

In a simpler implementation, steps 504a/506a (SKPL) and 504b/506b (multi-tap) may be implemented as described above. However, these steps may be implemented differently to boost the efficiency of the overall operation. For example, the acts 504a/506a may be integrated, and as with the acts 504b/506b. Furthermore, the vocabulary 124 in this case may not even contain words or letters at all, and instead it may contain key sequences. Here, a word based vocabulary is broken into key sequences that would generate these words, so save the step of translating from key sequences into letters. This saves time in interpreting key sequences and then cross-referencing the vocabulary, since the operations can go straight from a keypress sequence to the proposed completions. Some of these operations may be carried out by traversing a tree, referencing a run-length-encoded table structure, or other such task. A number of other variations are also possible. For further information on these alternatives, reference is made to U.S. Pat. No. 6,307,548, and U.S. application Ser. No. 11/379,354. These documents are incorporated by reference into the present disclosure.

Combine SKPL & Multi-Tap, Present Output

In step 507, the processor 106 combines the possible SKPL and multi-tap completions (from steps 506a, 506b, respectively). In one embodiment, step 507 is achieved by aggregating the results of steps 506a-506b.

In step 508, the processor 106 operates the display 102 to present (in the completions pane 155) some or all of the combined completions finalized in step 507. Also at this time, the processor 106 may optionally update the display of the default word at the insertion point 157. Optionally, step 508 may display a greater number of possible completions in the limited space of the pane 155 by affording a scrolling or other appropriate automatic or user-driven advancing feature.

Steps 507 and/or 508: Managing Overall Results

Due to the likely limited screen size of the display 102, measures may be taken to prioritize, reorder, trim, process, or otherwise modify the list of possible completions according to various strategies. This may occur in the act (step 507) of combining the results from 506a-506b, or in the presentation (step 508) of the combined entries, or both.

In one example, steps 507 and/or 508 offer the most likely completion first, the next most likely second, and so on. This ordering is done so that the user can see and select a desired completion after the fewest number of inputs, avoiding time wasted in looking through a long list of irrelevant words. As one example, frequency of use in written text of each vocabulary entry may be a factor in determining which entry to offer first, and this factor calculated with other factors to come up with a numerical ranking. Each vocabulary entry may have an associated weighting value or an ordinal position which serves as its value. Other considerations as to order or prioritization of the presented list may include recency of use, alphabetical order, word length, etc.

Frequency of use refers to the use of static or dynamic frequency information in accordance with a linguistic model, which may include one or more of: frequency of occurrence of a word in formal or conversational written text; frequency of occurrence of a word when following a preceding word or words; proper or common grammar of the surrounding sentence; application context of current word entry; and recency of use or repeated use of the word by the user or within an application program.

Another option is for the device to alternate the completions from each interpretation (SKPL or multi-tap) without respect for relative use. Another embodiment favors completions that represent user-added words over completions of generic vocabulary words regardless of their basis on the SKPL or multi-tap interpretation. Furthermore, in certain contexts (such as password entry) the completions may be suppressed entirely, for example, to prevent inadvertent revelation of stored passwords.

Measures may be taken to ensure that step 507 saves the user some input effort, or gives preference to completions that have been selected before. Otherwise, word completions on short stems, such as a single letter "C", begin a large number of vocabulary entries; but offering every word beginning with "C" is of no benefit to the user, and the processing required to identify them all may cause noticeable delays on low-powered handheld computers. Some techniques to address this include: (1) waiting to identify completions until after a predefined or user-selected number of letters have been entered, or (2) limiting identification of completions to those that exceed the number of keypresses by a given margin, etc. A complicating factor, however, is that users do not always look for or select a completion at the most optimal moment, and in fact some users (uncertain of the full spelling perhaps) might select a completion as soon as it is offered, so the most likely word completion may have to be offered earlier or later (i.e. during an input sequence that spells the beginning of that completed word) than would otherwise be necessary.

In some embodiments, steps 504a, 504b, 506a, and/or 506b may be skipped entirely depending on the user's selected configuration. Furthermore, in other embodiments, some or all of steps 504a, 504b, 506a, and/or 506b may extend the interpretation and completion logic to incorporate spell-correction techniques. For example, if the wrong key is pressed, or is pressed too few or too many times, edit distance or set-edit-distance calculations can suggest one or more corrected SKPL or multi-tap interpretations in addition to those matching the current keypress sequence. Some of these techniques are described in U.S. application Ser. No. 12/023,903 entitled SPELL-CHECK FOR A KEYBOARD SYSTEM WITH AUTOMATIC CORRECTION, filed Jan. 31, 2008 in the name of Kay et al.

Steps 507 and/or 508: SKPL versus Multi-Tap Priority

In addition to processing the overall list of completions as discussed above, the device may take steps to balance, tune, and prioritize the SKPL and multi-tap sets of completions relative to each other. Each set of completions (namely, SKPL and multi-tap) might contain more entries than can be shown on the small display, and these steps ensure that one set does not crowd out the other set unless or until it is evident which of the two interpretations the user is relying on for the current key sequence. Therefore, the prioritization of SKPL and multi-tap entries discussed herein concerns acts to show more entries from one interpretation than the other, increase screen size devoted to one interpretation, order lists to favor one interpretation, and the like.

As another example, step 507 may be performed to favor SKPL over the multi-tap interpretations until there are insufficient SKPL-based completion choices, at which point the multi-tap interpretation becomes a higher priority for completions. This is based on the insight that multi-tap input sequences feature many repeated presses of the same key, which is far less common in SKPL input sequences; with SKPL, repeated presses of the same key quickly eliminate many of the vocabulary entries. For instance, given the key mapping in FIG. 1C, if the user made four presses of the "8" key, this is easily interpreted as a multi-tap "S." However, with SKPL, the repeated entry of the same key narrows down the choices significantly; the system could only match vocabulary entries containing four consonants in a row in this case (selected from "P", "Q", "R", and "S"). In most languages a vowel occurs in every syllable, so a word with four consonants in a row would be rare. The lack of completions based on SKPL interpretations can serve as a signal to the system of the user's intent to employ or favor multi-tap, in addition to allowing room for more multi-tap-based completions if the list is limited in length. FIG. 1B shows an example of this condition, where the multi-tap-based completion "question" is listed first as it is a more likely word than the SKPL-based completion "sputter". Thus, the device may prioritize the SKPL interpretations (in number, display area, order, prominence, etc.) until the vocabulary entries arising from SKPL falls below a prescribed threshold.

Some other options for prioritizing display of SKPL versus multi-tap interpretations include:

Prioritizing completions of SKPL interpretations when the current key sequence has few or no repeated keys, which suggests that the user is not currently employing the multi-tap method. Alternatively, prioritizing completions of multi-tap interpretations when the current key sequence has repeated occurrences of the same key being pressed, occurrences of repeated keypresses of one key followed by repeated keypresses of another key, etc. This analysis of the contents of the key sequence (for determining whether to favor SKPL or multi-tap) occurs apart from the interpretation of the key sequence.

Watching for predefined entries via the keypad (or another data entry tool), where the predefined entries are particular to SKPL or multi-tap. For instance, this approach may prioritize completions of the multi-tap interpretation when a "timeout kill" (such as the right arrow key) has been used, which suggests that the user is currently employing the multi-tap method.

Favoring SKPL over multi-tap (or vice versa) according to application context. For instance, SKPL interpretations may be favored for open text fields, and multi-tap favored when the user is engaged in entering text unlikely to be in the vocabulary, such as an email address, phone number, name, address book entry, ISBN, etc.

Monitoring the user's selection of presented entries (step 509), and tracking whether the user selects SKPL or multi-tap entries. Then, the device prioritizes the combined list to favor the entries arising from the favored interpretation strategy. The tracking of user selection may be based on total numbers, recent selections, selections made in certain contexts, etc.

Monitoring the user's cadence in keypress entry (502), since multi-tap keypresses will likely have one timing, and SKPL keypresses will have a another timing.

The preceding strategies are automatic and do not require user awareness or deliberate action. Other options may be based on how the user has configured the system. For example, if the user selects a configuration where the multi-tap interpretation is the default (where for example the multi-tap interpretation might also appear at the insertion point 157), then in step 507 the processor 106 can prioritize the completions that are based on the multi-tap interpretation identified in step 506b.

In another example, the user may use the stylus or key or key sequence to resize or hide the respective segments of a list (vertical or otherwise) of interpretations and completions (where one segment contains SKPL completions and the other contains multi-tap completions). In doing so, the user indicates a relative importance of the multi-tap completions versus SKPL completions. As a more particular example, step 507 may vary the relative numbers of vocabulary entries arising from SKPL versus multi-tap interpretations according to a user-submitted ratio. The ratio may be entered by adjusting a slider, indicating a numerical blend, changing the size of a GUI feature, adjusting a dial, operating a pull-down menu, or many other ways. As a variation of this, the device may represent vocabulary entries arising from SKPL analysis in one pane, and those arising from multi-tap analysis in another pane, and vary the relative sizes of the panes according to the user-submitted radio.

Iterative Alternative

In a different embodiment, some or all of steps 504a, 504b, 506a, 506b, 507, and 508 may be limited as follows. Namely, steps 506a-506b terminate prematurely (with respect to a full analysis of all possible completions) as soon as these steps reach a prescribed number of completions, either jointly or singly. These truncated results are combined and presented in steps 507-508, and if the requests to view further entries, then steps 506a-506b are reinitiated. The user request, for example, may occur in the form of scrolling through a list, operating a pulldown menu, pressing a designated key or key combination or key sequence, etc. This approach speeds the completion of steps 506a-506b, and avoids further calculations until actually needed.

Further Action

After step 508 presents some interpretations and completions of the user's keypress entry so far, step 509 waits for user input. Depending upon the nature of the user input, step 509 can progress in various ways. For one, the user may take action (509a) to begin activity (512) completely unrelated to keypad driven text entry. For instance, the user may operate the device 100 to place a call, play a game, start an unrelated application program, or perform another function. In some embodiments, taking such an action automatically confirms the default interpretation. In contrast to this, the user may add to the keypresses so far by entering (509c) another keypress. In this event, the routine 500 returns to steps 504a, 504b, to begin processing the keypress sequence as supplemented by the new keypress.

In contrast to user actions 509a and 509c, the user may choose (509b) one of the SKPL interpretations displayed in the SKPL pane 153, the interpretation displayed in the multi-tap pane 154, or one of the proposed completions displayed in the completions pane 155. The user may carry out this choice in various ways, such as by pressing the Space key and implicitly accepting the default word, by first pressing one or more arrow keys (and/or the OK key) to change the selection from the default, or by tapping on the word directly with finger or stylus. There may be further variations (not shown) to the preceding user options, such as when the user has changed the default selection but not accepted the word yet, and even may be able to continue pressing letter keys. In this case the processor 106 remains at step 509, and either continues to step 510 if the user chooses a proposed completion, or returns to steps 504a, 504b if the user continues entering key presses.

When the processor 106 detects that the user has chosen (509b) one of the displayed alternatives, the device 100 performs step 510. Here, the processor 106 optionally operates the display 102 to change the default or selected interpretation shown to the selected interpretation or completion (from the panes 153-156) that the user elected in step 509b. Henceforth, this word will be part of the words (158) that the user has entered and confirmed. The new word under construction, at this point, will be empty pending the entry of some new key presses.

After step 510, the processor 106 waits for other input (510a) or a new key press (510b), which lead to resulting actions as discussed previously.

Alternative

The following example provides an alternative for certain aspects of the sequence. Namely, this example uses the following context for user entry of keypresses—entering a search term for the device 100 to execute. In this embodiment, instead of presenting the SKPL word and stem interpretations in a separate pane, the processor 106 presents them in situ with the search results. In this embodiment, then, the body or bodies of text being searched serve as the vocabulary 124.

Figure 7:
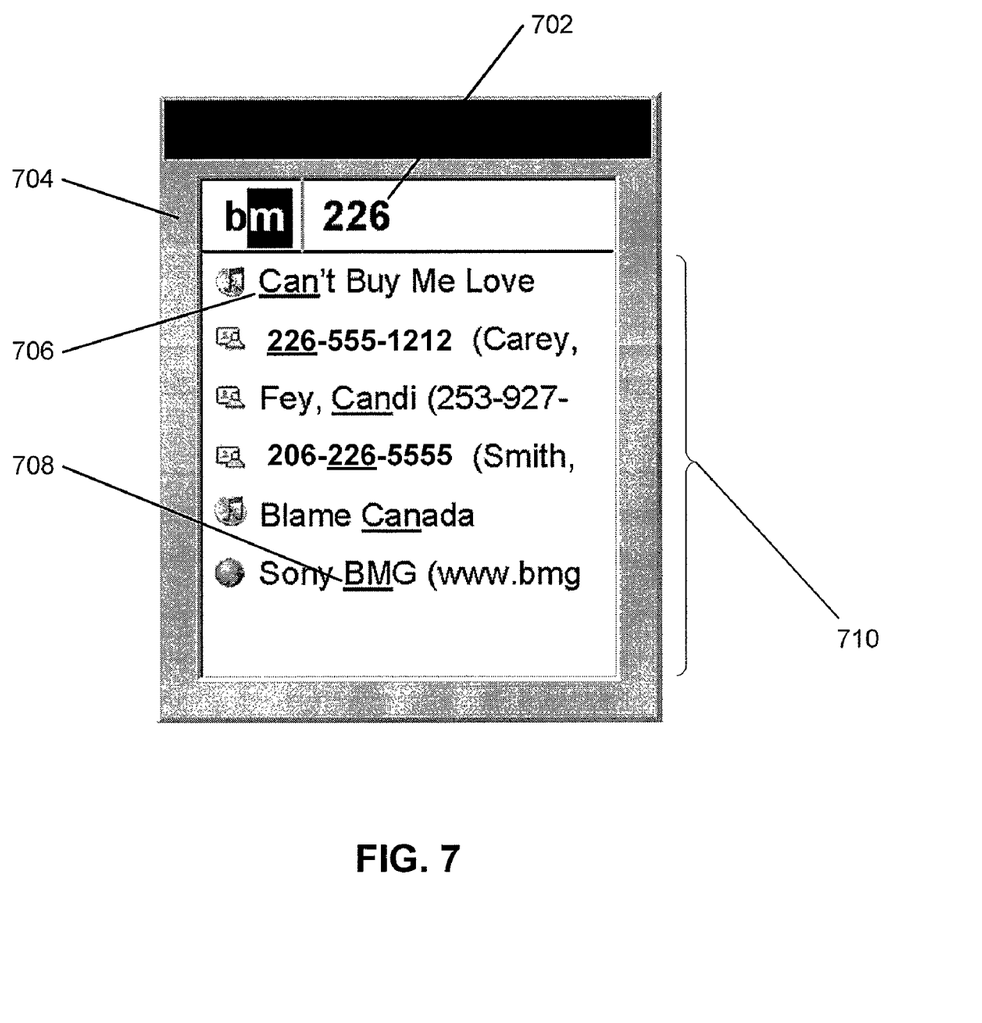
FIG. 7 shows a screen shot of a different embodiment.

FIG. 7 shows an example. In this screen shot, the display includes a multi-tap pane 704 (which acts like the multi-tap pane 154 of FIG. 1B), and a numerical keypress buffer 702 (which acts like the buffer 156 of FIG. 1B). Instead of the completions pane 155, the device 100 presents a search results pane 710. This pane 710 indicates where the current key sequence has (at least partially) matched the search results (such as 706 for the SKPL interpretation of the current key press sequence, and 708 for the multi-tap interpretation of the current key press sequence), within the text of each matching search result. In the present example, the pane 710 shows search results from a combined search of an address book, stored music, and Internet web sites.

In the embodiment of FIG. 7, then, the user first initiates a search operation (not shown). Then, the sequence 500 is performed to assist the user in spelling out the desired search terms. The output, in the form of the search results pane 710, is presented in step 508. The search results are integrated with the body of text being searched. At this point, the user can proceed to an unrelated task (such as starting a different application, placing a call, etc.), as shown by steps 509, 509*a*. Or, the user can continue entering keypresses, as shown by steps 509, 509*c*.

Or, the user can choose one of the displayed search matches (from the pane 710), which occurs in step 509*b*. In this event, the device 100 proceeds to step 510, which (instead of the function as displayed in FIG. 5) acts to provide a more complete listing of the item found in the search and prompt the user for confirmation, or automatically activate the found item by playing a found song, calling a found address book entry, navigating to a web site address, etc. Step 510*b* in this embodiment is inapplicable, if the prompted action is answered by a non-letter key input.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented text entry method employing a display and a multi-key keypad, comprising operations of:
   via the keypad, receiving user entry of a sequence of keypresses in an order, the sequence of keypresses representing an intended series of letters collectively spelling-out some or all of a desired textual object, where resolution of the intended series of letters and the desired textual object is ambiguous because some or all of the keypresses individually represent multiple letters;
   after each new keypress, automatically and substantially concurrently preparing alternative interpretations of the sequence of keypresses according to multiple inconsistent keypress interpretation strategies, comprising:
      employing a one-keypress-per-letter interpretation of keypress sequence to identify each entry in the vocabulary matching the keypress sequence, and each entry in the vocabulary with a stem matching the keypress sequence;
      employing a multi-tap interpretation of keypress sequence to identify each entry in the vocabulary matching the keypress sequence, and each entry in the vocabulary with a stem matching the keypress sequence;

utilizing the display to provide a human-readable presentation including a selected combination of vocabulary entries identified by one-keypress-per-letter interpretation and vocabulary entries identified by multi-tap interpretation, where the operation of utilizing the display comprises, in response to user submission of the keypresses having occurred within one or more predetermined application contexts, varying a display proportion as between presented entries arising from the multi-tap interpretations and presented entries arising from the single-keypress-per-letter interpretations.

2. The method of claim 1, where the operation of preparing alternative interpretations is terminated upon identifying sufficient identified vocabulary entries to substantially occupy the display or a predetermined region of the display, and the operations further include after displaying the sufficient identified vocabulary entries reactivating the operation of preparing alternative interpretations in response to prescribed user input requesting to view further vocabulary entries.

3. A computer-implemented text entry method employing a display and a multi-key keypad, comprising operations of:
via the keypad, receiving user entry of a sequence of keypresses in an order, the sequence of keypresses representing an intended series of letters collectively spelling-out some or all of a desired textual object, where resolution of the intended series of letters and the desired textual object is ambiguous because some or all of the keypresses individually represent multiple letters;
after each new keypress, automatically and substantially concurrently preparing alternative interpretations of the sequence of keypresses according to multiple inconsistent keypress interpretation strategies, comprising:
employing a one-keypress-per-letter interpretation of keypress sequence to identify each entry in the vocabulary matching the keypress sequence, and each entry in the vocabulary with a stem matching the keypress sequence;
employing a multi-tap interpretation of keypress sequence to identify each entry in the vocabulary matching the keypress sequence, and each entry in the vocabulary with a stem matching the keypress sequence;
utilizing the display to provide a human-readable presentation including a selected combination of vocabulary entries identified by one-keypress-per-letter interpretation and vocabulary entries identified by multi-tap interpretation,
the operation of utilizing the display comprising maintaining the presentation to include a greater number of vocabulary entries arising from the one-keypress-per-letter interpretation than a number of presented vocabulary entries arising from the multi-tap interpretation until vocabulary entries arising from the one-keypress-per-letter interpretation fall below a prescribed quantity.

4. A computer-implemented text entry method employing a display and a multi-key keypad, comprising operations of:
via the keypad, receiving user entry of a sequence of keypresses in an order, the sequence of keypresses representing an intended series of letters collectively spelling-out some or all of a desired textual object, where resolution of the intended series of letters and the desired textual object is ambiguous because some or all of the keypresses individually represent multiple letters;
after each new keypress, automatically and substantially concurrently preparing alternative interpretations of the sequence of keypresses according to multiple inconsistent keypress interpretation strategies, comprising:
employing a one-keypress-per-letter interpretation of keypress sequence to identify each entry in the vocabulary matching the keypress sequence, and each entry in the vocabulary with a stem matching the keypress sequence;
employing a multi-tap interpretation of keypress sequence to identify each entry in the vocabulary matching the keypress sequence, and each entry in the vocabulary with a stem matching the keypress sequence;
utilizing the display to provide a human-readable presentation including a selected combination of vocabulary entries identified by one-keypress-per-letter interpretation and vocabulary entries identified by multi-tap interpretation,
where the operation of utilizing the display comprises varying relative numbers of presented vocabulary entries arising from the one-keypress-per-letter and multi-tap interpretations according to a user submitted ratio.

5. A computer-implemented text entry method employing a display and a multi-key keypad, comprising operations of:
via the keypad, receiving user entry of a sequence of keypresses in an order, the sequence of keypresses representing an intended series of letters collectively spelling-out some or all of a desired textual object, where resolution of the intended series of letters and the desired textual object is ambiguous because some or all of the keypresses individually represent multiple letters;
after each new keypress, automatically and substantially concurrently preparing alternative interpretations of the sequence of keypresses according to multiple inconsistent keypress interpretation strategies, comprising:
employing a one-keypress-per-letter interpretation of keypress sequence to identify each entry in the vocabulary matching the keypress sequence, and each entry in the vocabulary with a stem matching the keypress sequence;
employing a multi-tap interpretation of keypress sequence to identify each entry in the vocabulary matching the keypress sequence, and each entry in the vocabulary with a stem matching the keypress sequence;
utilizing the display to provide a human-readable presentation including a selected combination of vocabulary entries identified by one-keypress-per-letter interpretation and vocabulary entries identified by multi-tap interpretation,
where the operation of utilizing the display comprises presenting the vocabulary entries identified by one-keypress-per-letter interpretation and multi-tap interpretations in separate panes, and further varying relative sizes of the panes according to a user submitted ratio.

6. The method of claim 5, further comprising, choosing a default word from the displayed vocabulary entries and displaying the chosen word at a displayed cursor position, where the choice of default word as between the one-keypress-per-letter and multi-tap interpretations is conducted in accordance with which of the one-keypress-per-letter and multi-tap interpretations is favored by the user submitted ratio.

7. The method of claim 1,
the operations further comprising monitoring at least one of the following in order to identify any user preference as between single-keypress-per-letter and multi-tap entry schemes:

user selection of presented vocabulary entries presented and which of the single-keypress-per-letter and multi-tap interpretations gave rise to the selection;

occurrence of repeated keypresses in the keypress sequence;

user submittal of predefined entries via the keypad or another data entry tool, where the predefined entries are specific to a particular one single-keypress-per-letter and multi-tap entry schemes;

cadence employed by the user while entering keypresses;

where the operation of utilizing the display further comprises automatically adjusting a relative proportion of vocabulary entries arising from the single-keypress-per-letter and multi-tap entry interpretation in response to said identifying of a user preference.

8. The method of claim 1, where the letters are embodied by one or more of the following: letters of one or more alphabets, symbols, punctuation marks, emoticons, numerals, elements of a script, components of a phonetic system.

9. The method of claim 1, further comprising utilizing the display to present a numerical interpretation of the sequence of keypresses.

10. The method of claim 1, where the operations further comprise making human readable presentation of a search prompt, and where the user entry of the sequence of keypresses occurs in response to the search prompt, and where the vocabulary comprises one or more bodies of search data, and where the operation of utilizing the display comprises displaying entries from the combined list in situ within the bodies of search data or excerpts from the bodies of search data.

* * * * *